(12) United States Patent
Meyer et al.

(10) Patent No.: US 7,348,502 B2
(45) Date of Patent: Mar. 25, 2008

(54) COUNTERBALANCE FOR A PLATFORM BALANCE

(75) Inventors: Richard A. Meyer, Chaska, MN (US); Ian T. Kunsch, Eden Prairie, MN (US); Christopher P. Zupancich, Shakopee, MN (US); Bradley C. Litz, Chaska, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 28 days.

(21) Appl. No.: 11/389,519

(22) Filed: Mar. 25, 2006

(65) Prior Publication Data
US 2007/0221418 A1 Sep. 27, 2007

(51) Int. Cl.
*G01G 1/00* (2006.01)
(52) U.S. Cl. .................. 177/235; 177/248; 177/252
(58) Field of Classification Search ............. 177/171, 177/172, 190–198, 235–237, 246–252
See application file for complete search history.

(56) References Cited
U.S. PATENT DOCUMENTS

| | | | |
|---|---|---|---|
| 3,160,219 A | * | 12/1964 | Meier .................... 177/198 |
| 3,590,933 A | * | 7/1971 | Forman .................. 177/229 |
| 3,789,508 A | | 2/1974 | Meline ..................... 33/778 |
| 3,955,638 A | * | 5/1976 | Wasko .................... 177/212 |
| 4,153,124 A | * | 5/1979 | Knothe et al. ....... 177/210 EM |
| 4,607,531 A | | 8/1986 | Meline et al. ............. 73/794 |
| 4,841,226 A | | 6/1989 | Meline et al. ............ 324/662 |
| 4,844,192 A | * | 7/1989 | Wirth .................... 177/225 |
| 4,879,906 A | | 11/1989 | Meline et al. ............. 73/826 |
| 4,939,445 A | | 7/1990 | Meline et al. ............ 324/663 |
| 5,119,569 A | | 6/1992 | Meline ..................... 33/790 |
| 5,712,430 A | | 1/1998 | Meyer ..................... 73/831 |

* cited by examiner

Primary Examiner—Randy W Gibson
(74) Attorney, Agent, or Firm—Steven M. Koehler; Westman, Champlin & Kelly, P.A.

(57) ABSTRACT

A platform balance includes a first frame support and a second frame support movable relative to the first frame support. At least one counter balance assembly is provided to support the static weight of the first frames support and elements connected thereto. The counterbalance assembly includes a beam and a pivot assembly allowing the beam to pivot. A weight is selectively positionable on the beam. A compliant assembly is supported by the beam on a portion thereof on a side of the pivot assembly opposite the weight. The compliant assembly supports the first frame support. The compliant assembly includes a second pivot assembly and a planar motion assembly coupled to the second pivot assembly.

25 Claims, 7 Drawing Sheets

COUNTERBALANCE FOR A PLATFORM BALANCE

BACKGROUND OF THE INVENTION

The discussion below is merely provided for general background information or exemplary environments, and is not intended to be used as an aid in determining the scope of the claimed subject matter.

The measurement of loads, both forces and moments, with accuracy and precision is important to many applications. A common use, where several moments and forces need to be measured, is in the testing of specimens in a wind tunnel. Test specimens can be placed on a platform balance located in a pit of the wind tunnel. The platform balance can be adapted to receive a vehicle or other large test specimens, rather than merely a scale model of the vehicle. Actual vehicles, rather than scale models of the vehicles, allow the designer to determine actual measurements of prototypes, rather than merely inferential measurements. If the test specimen is a vehicle with wheels, the platform balance can be equipped with a rolling belt to rotate the wheels, which can make a significant improvement in measurement accuracy and simulate real world environments.

Up to six components of force and moment act on a test specimen on the platform balance in the wind tunnel. If six components are present, they are typically referred to as lift force, drag force, side force, pitching moment, yawing moment, and rolling moment. The moments and forces that act on the test specimen are usually resolved into three components of force and three components of moment with transducers that are sensitive to the components.

With a vehicle placed on the platform balance, the combined weight of the vehicle, specimen support frame and rolling belts to drive the wheels can easily be tens of thousands of pounds. Typically, a counterbalance is provided to support the static weight of these components. In this manner, the transducers need not be designed to support the static weight, but rather, can be designed to resolve small forces. In order to allow the transducers to detect these small forces, the counterbalance must be compliant for the small forces. Although counterbalances have been used in the prior art, there is a continuing need for improved counterbalances, which in effect, allows the transducers of the platform balance to resolve even smaller forces.

SUMMARY OF THE INVENTION

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

In one aspect, a platform balance includes a first frame support and a second frame support movable relative to the first frame support. At least one counter balance assembly is provided to support the static weight of the first frames support and elements connected thereto. The counterbalance assembly includes a beam and a pivot assembly allowing the beam to pivot. A weight is selectively positionable on the beam. A compliant assembly is supported by the beam on a portion thereof on a side of the pivot assembly opposite the weight. The compliant assembly supports the first frame support. The compliant assembly includes a second pivot assembly and a planar motion assembly coupled to the second pivot assembly.

As another aspect, a platform balance includes a first frame support and a second frame support movable relative to the first frame support. At least one counter balance assembly is provided to support the static weight of the first frames support and elements connected thereto. The counterbalance assembly includes a beam and a cross flexure pivot assembly allowing the beam to pivot. A weight is selectively positionable on the beam.

DETAILED DESCRIPTION OF THE ILLUSTRATIVE EMBODIMENT

An aspect of this disclosure relates to a counterbalance for a platform balance they used to measure linear forces along and/or moments about up to three orthogonal axes. The disclosure, including the figures, describes a counterbalance, a platform balance having the counterbalance and included transducers with reference to an illustrative example. The present invention is described with respect to the platform balance and transducer assembly for illustrative purposes only. Other examples are within the knowledge of someone skilled in the art. The scope of the invention is not limited to this example, i.e., the described embodiment of the invention. Rather, the scope of the invention is defined by reference to the appended claims. Changes can be made to the examples, including alternative designs not disclosed, and still be within the scope of the claims.

Figure 1:
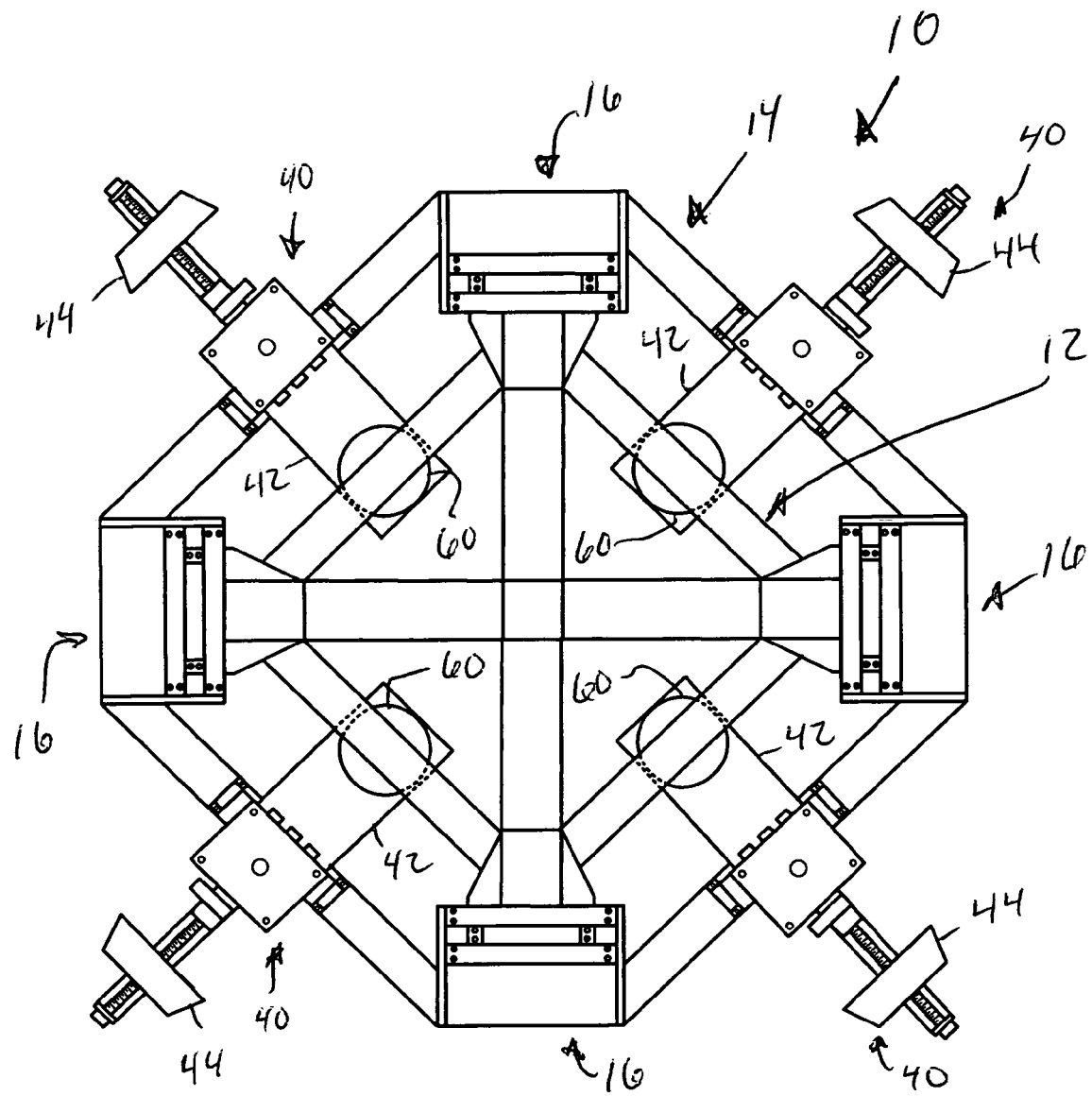
FIG. 1 is a plan view of an exemplary platform balance constructed in accordance with the present disclosure.
Figure 2:
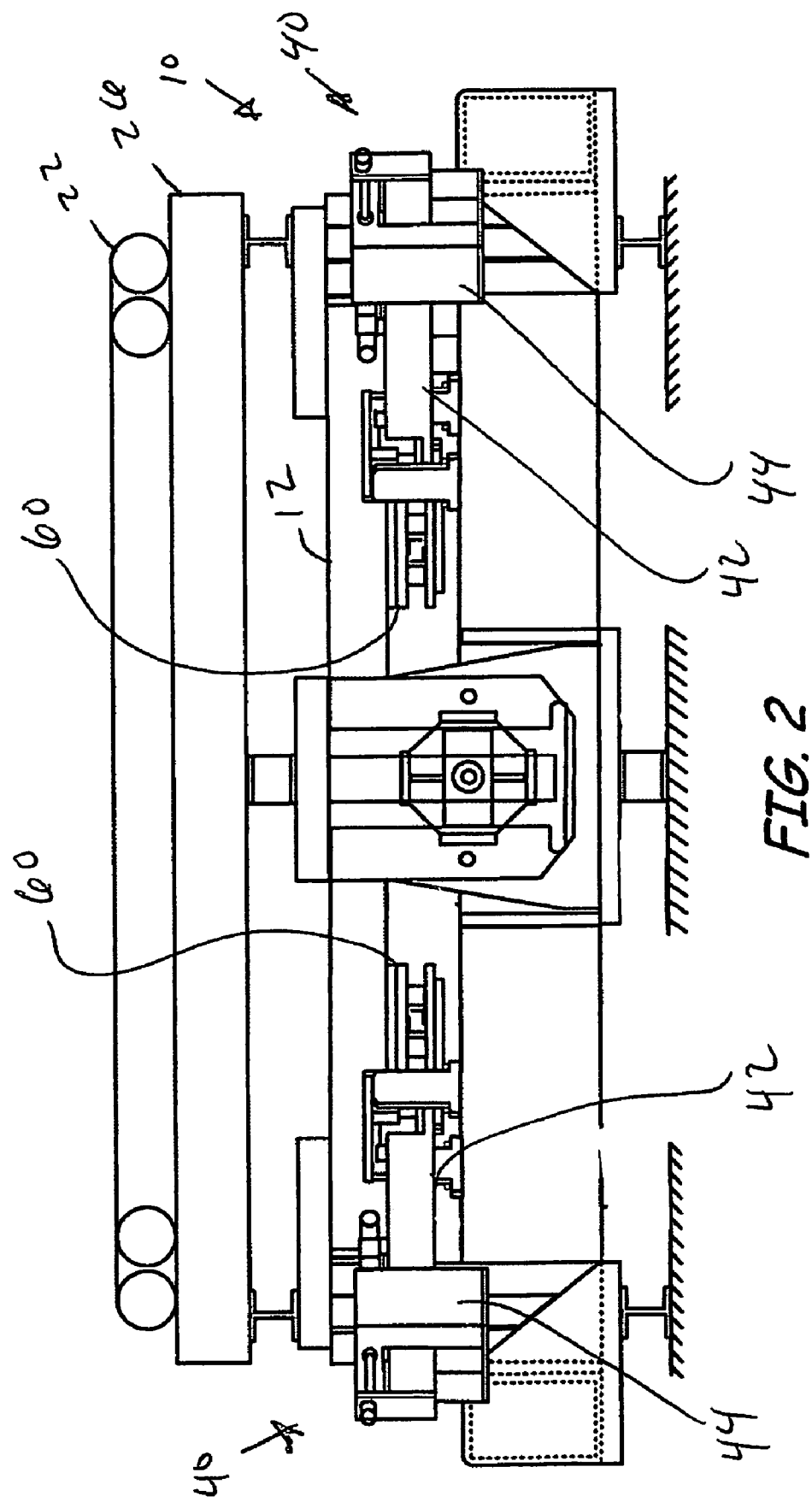
FIG. 2 is an elevation view of the platform balance of FIG. 1 having additional features and is suitable for receiving a test specimen.

An exemplary embodiment of a platform balance 10 of the present disclosure is illustrated in FIGS. 1-2. In the embodiment illustrated, the platform balance 10 can include a first frame support 12 and a second frame support 14. A plurality of transducer assemblies 16, herein four although any number three or more can be used, couple the first frame support 12 to the second frame support 14. The platform balance 10 can be used to measure forces and/or moments applied to a test specimen of nominally large weight or mass such as a vehicle, engine, plane, etc. The frame supports 12 and 14 are nominally unstressed reaction frames, wherein each of the transducers can be a two-axis force transducer, or take other forms. One form of transducer that can be used in the platform balance 10 is described in the U.S. published patent application 20050120808, published Jun. 9, 2005, (the content of which is hereby incorporated by reference in its entirety), although other forms of transducers can also be used.

The platform balance 10 is particularly well suited for use in measuring forces upon a vehicle or other large test specimen in a wind tunnel. In such an application, rolling roadway belts, schematically illustrated at 22, are supported by an intermediate frame 24 coupled to frame support 12.

The rolling roadway belts 22 support the vehicle tires. In some embodiments, a single roadway belt is used for all tires of the vehicle. The platform balance 10 and rolling roadway belt assemblies 22 are commonly positioned in a pit and mounted to a turntable mechanism 26 so as to allow the test specimen, for example a vehicle, to be selectively turned with respect to the wind of the wind tunnel.

One or more counterbalance systems or assemblies 40 are provided to support the nominal static mass of the test specimen, frame support 12 one or more of belt assemblies 22 and other components of the operating environment such as roadways, simulators and components of the platform balance itself. Although only one counterbalance system 40 could be used (typically connected at the center of the balance), in many applications it is desirable to use three or more (herein exemplified using four) counterbalance systems 40 spaced about the platform balance 10. Use of more than one counterbalance system 40 can provide additional stability.

Figure 3:
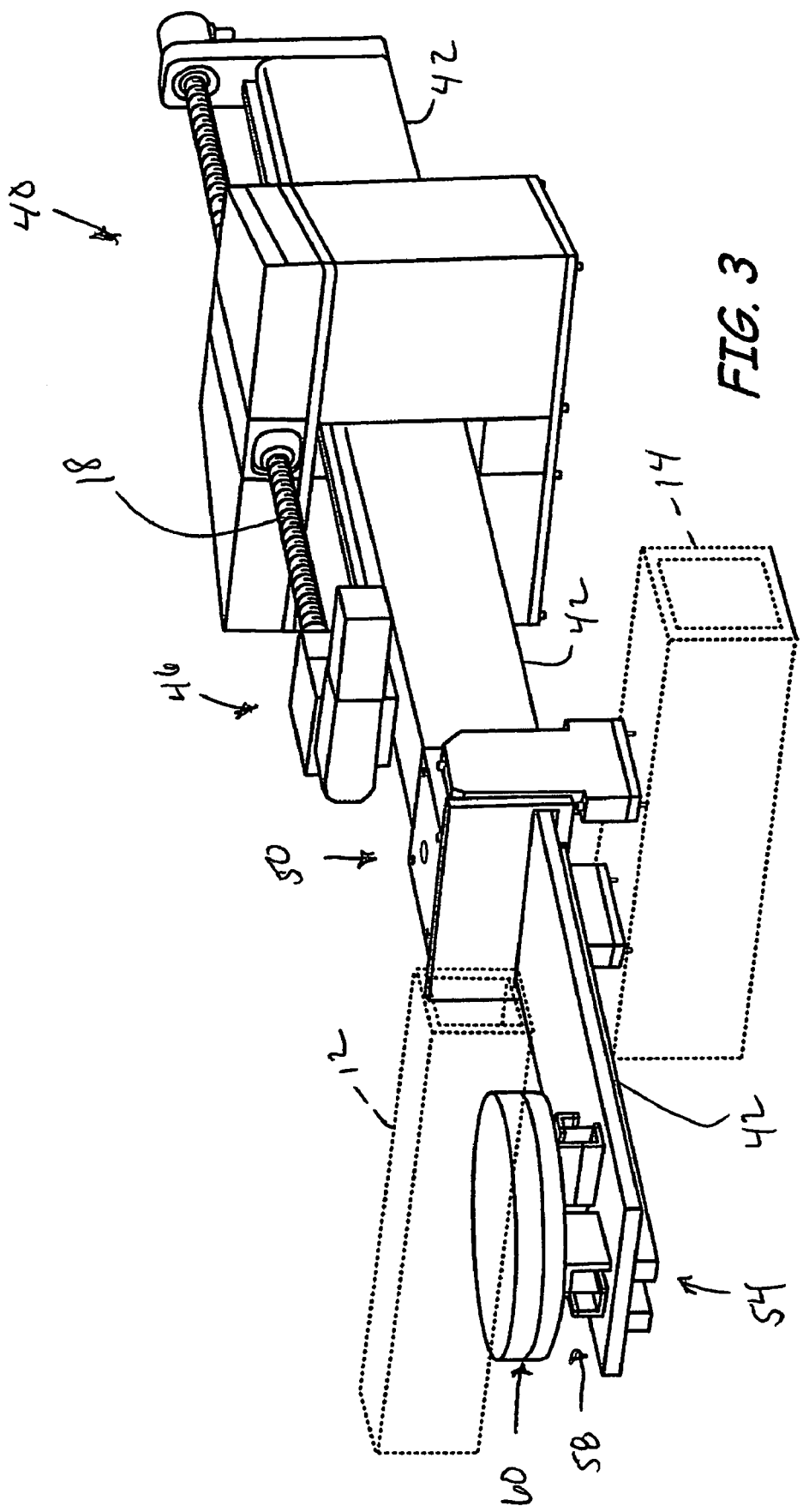
FIG. 3 is a perspective view of a counter balance.
Figure 4:
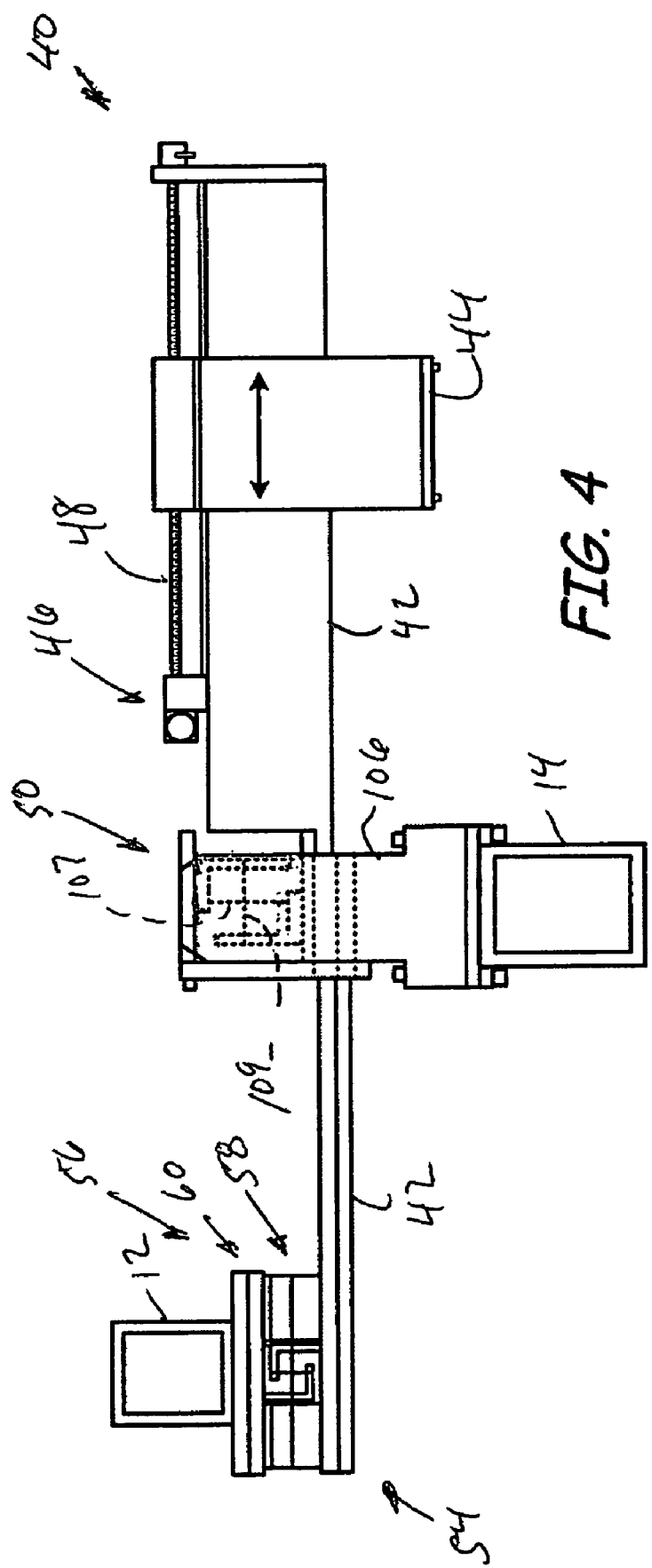
FIG. 4 is a side elevation view the counter balance.

Counterbalance system 40 is illustrated in more detail in FIGS. 3 and 4. Counterbalance system 40 includes a beam 42 that pivots with respect to frame support 14. A counterweight 44 is moveable along beam 42, for example, being slidable thereon. A weight driver 46 selectively moves counterweight 44 along beam 42 to desired positons in response to control signals provided thereto. In the embodiment illustrated, weight driver 46 comprises an electric motor rotating a screw shaft 48. Counterweight 44 threadably engages screw shaft 48. As appreciated by those skilled in the art, many different assemblies can be used to control the position of the counterweight 44 on beam 42. In particular, hydraulic, pneumatic and/or electric drive devices can be used.

Beam 42 pivots with respect to frame support 14 using a pivot assembly 50. Further description of pivot assembly 50 is provided below.

A remote end 54 of beam 42 is operably coupled to frames support 12 in order to support the weight of the specimen, roadway belts, etc. In order to provide additional compliance, end 54 includes a compliant assembly 56 that provides compliant freedom of motion(s). Compliant assembly 56 includes a pivot assembly 58, providing a low resistance (substantially frictionless) pivoting motion, and a planar motion assembly 60 that provides low resistance (substantially frictionless) motion in a plane.

Figure 5:
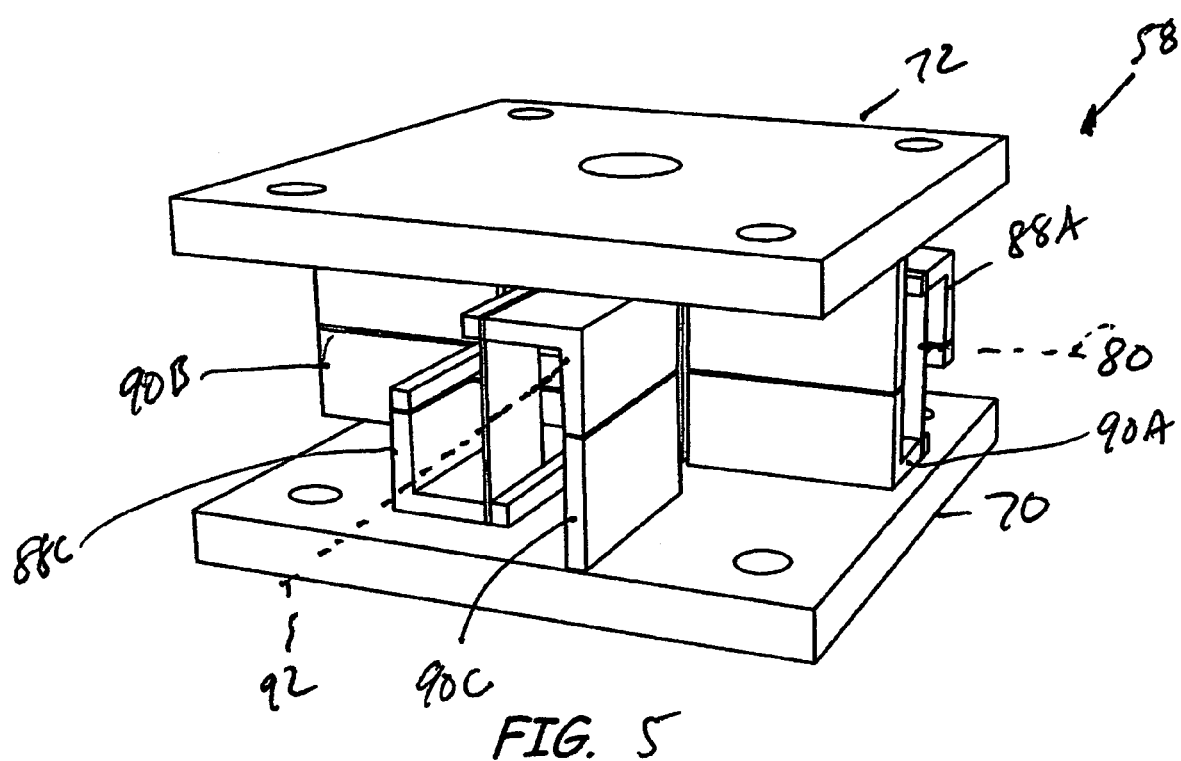
FIG. 5 is a perspective view of a cross flexure assembly.
Figure 6:
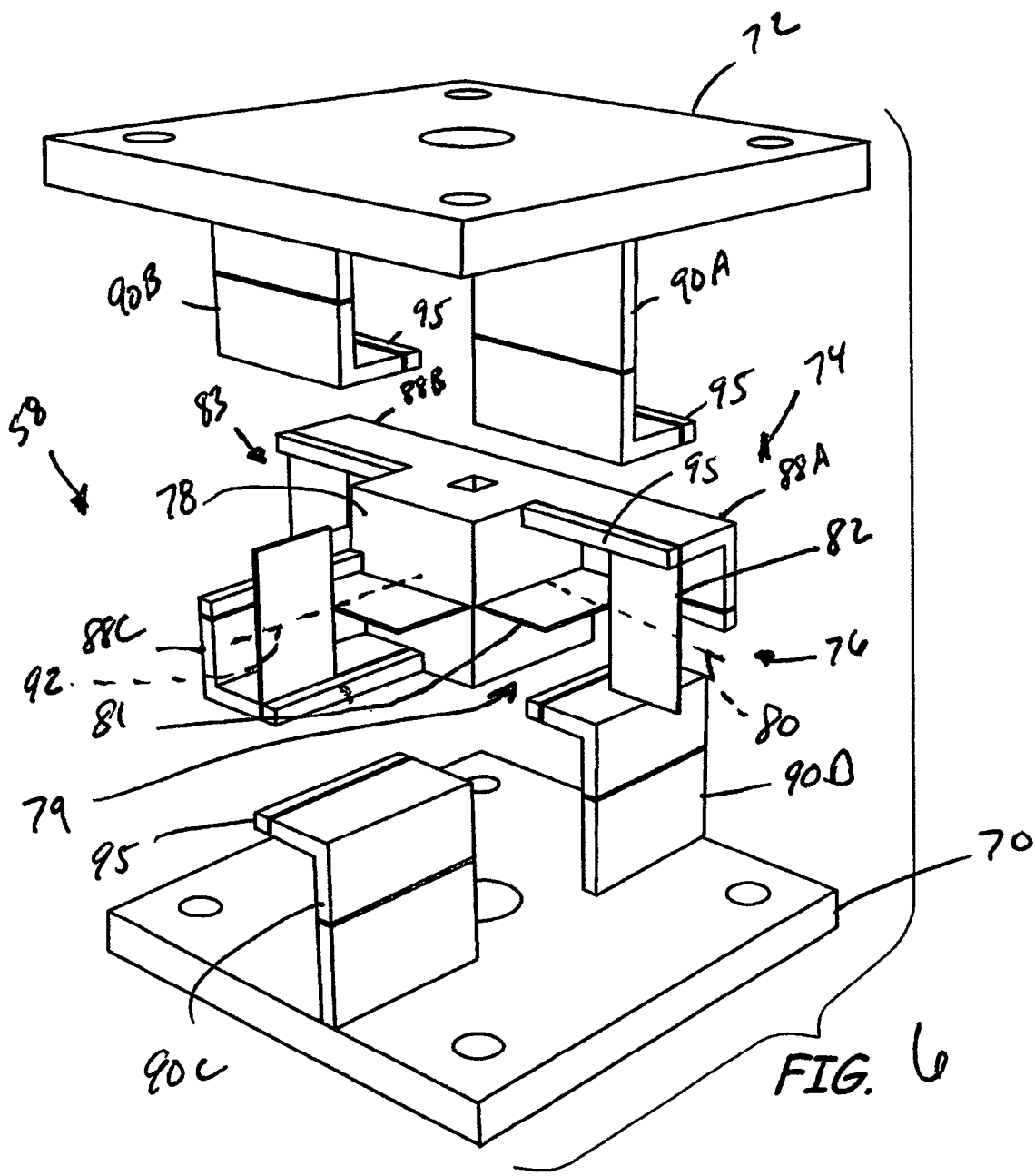
FIG. 6 is an exploded view of the cross flexure assembly.
Figure 7:
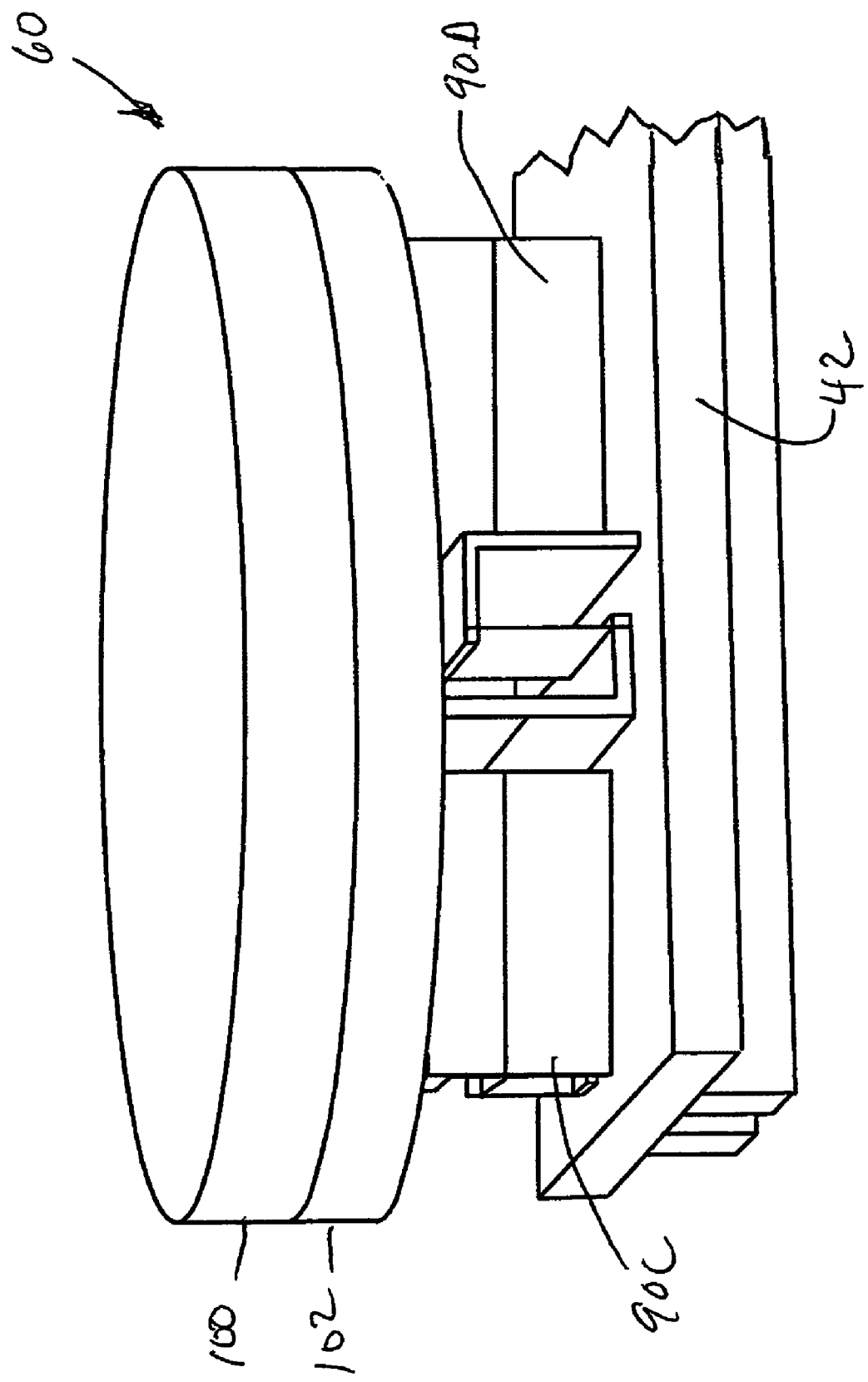
FIG. 7 is a perspective view of a compliant assembly.

The pivot assembly 58 can take a number of forms, and is preferably pivotable in dual degrees of freedom. For instance, the pivot assembly 58 can comprise a U-joint formed from mechanical bearing elements, fluid bearings (e.g. hydrostatic), or the like. In the embodiment illustrated, pivot assembly 58 comprises a dual axis cross flexure assembly providing two orthogonal degrees of pivoting motion. FIGS. 5 and 6 illustrates cross flexure assembly 58. Support members 70 and 72 pivot relative to each other in two orthogonal degrees of freedom. Pivoting motion is provided by a flexure assembly 74 having a plurality of thin flexible plates 76. Each of the flexible plates are joined at one end to intermediate member 78, while a second end is joined to support member 70 or 72.

At least one pair of orthogonal plates is provided to allow support member 70 to pivot with respect to support member 72 along an axis generally coinciding with the planes of the intersection of the plates. Referring to FIG. 5, support member 70 can pivot with respect to support member 72 generally about an axis 80. In the embodiment illustrated, this pivoting motion is provided by two spaced apart sets of orthogonally arranged plates. A first pair 79 comprises plates 81 and 82, while a second pair 83 is identical to the first pair and disposed on the other side of the intermediate member 78. In the embodiment illustrated, intermediate member 78 includes a support 88A extending therefrom, while support member 72 includes a downwardly extending support 90A. Plates 81 and 82 are coupled to supports 88A and 90A in an orthogonal relationship as illustrated. The second pair of orthogonal plates 83 is coupled to supports 88B and 90B in a similar fashion again in order to allow pivoting motion generally about axis 80.

In a manner similar to that described above with respect to axis 80, two spaced-apart sets of orthogonal pairs of flexible plates that are coupled to supports of intermediate member 78 (i.e., 88C and another support not shown) and upwardly extending supports 90C and 90D from support member 70. These orthogonal pairs of plates allow support members 70 and 72 to pivot generally about an axis 92. It is important to understand that this is but one embodiment to arrange cross flexures in order to provide pivoting motion. For example, if desired, one of the orthogonal cross flexure plates can include an aperture of size to allow the other corresponding flexure plate to extend therethrough. Each of the flexible plates 76 can be secured at ends thereof between portions of the support members 90A-90D and 78, where the portions are fastened together with suitable fastening devices such as threaded bolts. Likewise, mounting blocks 95 and fastening devices such as threaded bolts can be used to secure other ends of the flexible plates.

Planar motion assembly 60 allows motion of support member 72 in two degrees of linear motion or a plane relative two frame support 12. Planar motion assembly 60 can take many forms including using mechanical bearing elements (e.g. a plurality of balls) or a fluid bearing such as an air or hydrostatic bearing assembly. Typically planar motion assembly 60 has two facing plates 100 and 102, where plate 100 is coupled to frame support 12 and plate 102 is coupled to support member 72.

It should be noted that in an alternative embodiment cross flexure assembly 58 and planar motion assembly 60 can be interchanged in that the cross flexure assembly 58 can be coupled to frame support 12, while planar motion assembly 60 is coupled to beam 42.

The pivot assembly 50 is designed to provide pivoting motion about one axis. Although various types of pivot assemblies can be used with other features of the counterbalance system 40 herein described, in one embodiment, pivot assembly 50 comprises a single axis cross flexure assembly that provides very little resistance to pivoting motion of beam 42. When embodied as a cross flexure assembly, pivot assembly 50 also includes at least one pair of orthogonal thin flexible plates. In one embodiment, two pairs of spaced-apart orthogonal thin flexible plates are used in a manner similar that described with pivot assembly 58. A support member 106 extends upwardly and over beam 42 so flexible plate(s) 107 is oriented vertically with an upper end connected to the support member 106 and lower end connected to beam 42. This causes the flexible plate(s) to be in tension due to the weight of beam 42. Horizontal plate(s) 109 is also coupled to support number 106 and beam 42 in order to complete the cross flexure assembly. In one embodiment, a pair of spaced-apart cross flexures (each cross flexure comprising two orthogonal flexible plates) is configured in a manner similar to that described with pivot assembly 58 to allow pivoting motion about a single axis. It should be understood that although illustrated wherein support member 106 is attached to frame support 14, in another embodiment, the counterbalance 40 can be self-supporting.

Although not forming part of the of invention herein described, platform balance 10 can include one or more overtravel stops as is known and the art to limit movement of frame support 12 relative to frame support 14 (or ground). The overtravel stops thereby support the weight of frame support 12 and elements connected thereto so that the static weight is not carried by one or more of the transducers 16. In addition, a suitable mechanism could also be provided to selectively lock each counterbalance assembly so that the corresponding beam 42 does not pivot.

The present invention has now been described with reference to several embodiments. Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A platform balance comprising:
   a first frame support;
   a second frame support, the first frame support and the second frame support being movable relative to each other; and
   at least one counter balance assembly comprising:
      a beam;
      a first pivot assembly supported by the second frame support and joined to the beam to allow the beam to pivot;
      a weight selectively positionable along a length of the beam; and
      a compliant assembly supported by the beam on a portion thereof on a side of the first pivot assembly opposite the weight, the compliant assembly supporting the first frame support, the compliant assembly comprising:
         a second pivot assembly; and
         a planar motion assembly coupled to the second pivot assembly.

2. The platform balance of claim 1 wherein the second pivot assembly is configured to provide pivoting motion about two orthogonal axes.

3. The platform balance of claim 2 wherein the planar motion assembly is configured to provide motion in a plane.

4. The platform balance of claim 3 wherein the second pivot assembly comprises a cross flexure assembly comprising two spaced-apart sets of orthogonal arranged flexible plates wherein one set of the flexible plates is parallel to a longitudinal axis of the beam.

5. The platform balance of claim 4 wherein the cross flexure assembly comprises:
   a first support member;
   a second support member;
   an intermediate member;
   a first pair of flexible plates joining the first support member to the intermediate member, the first pair flexible plates being configured orthogonal to each other to allow pivoting motion of the first support member relative to the second support member about a first axis; and
   a second pair of flexible plates joining the second support member to the intermediate member, the second pair flexible plates being configured orthogonal to each other to allow pivoting motion of the first support member relative to the second support member about a second axis orthogonal to the first axis.

6. The platform balance of claim 5 wherein the planar motion assembly comprises a fluid bearing.

7. The platform balance of claim 6 wherein the first pivot assembly comprises a cross flexure assembly.

8. The platform balance of claim 1 wherein the first pivot assembly comprises a cross flexure assembly.

9. The platform balance of claim 8 wherein the planar motion assembly comprises a fluid bearing.

10. A platform balance comprising:
    a first frame support;
    a second frame support, the first frame support and the second frame support being movable relative to each other; and
    at least one counter balance assembly coupling the first and second frame supports, the at least one counter balance assembly comprising:
       a beam;
       a cross flexure pivot assembly supported by the second frame assembly and allowing the beam to pivot;
       a weight selectively positionable along a length of the beam; and
       a planar motion assembly coupled to the beam wherein the planar motion assembly supports the first frame support.

11. The platform balance of claim 10 wherein the cross flexure pivot assembly comprises two spaced-apart sets of orthogonal arranged flexible plates wherein one set of the flexible plates is parallel to a longitudinal axis of the beam.

12. The platform balance of claim 10 and further comprising a second pivot assembly supported by the beam remote from the weight.

13. The platform balance of claim 12 wherein the second pivot assembly is configured to provide pivoting motion about two orthogonal axes.

14. The platform balance of claim 13 wherein the second pivot assembly comprises a cross flexure assembly.

15. The platform balance of claim 14 wherein the cross flexure assembly comprises:
    a first support member;
    a second support member;
    an intermediate member;
    a first pair of flexible plates joining the first support member to the intermediate member, the first pair flexible plates being configured orthogonal to each other to allow pivoting motion of the first support member relative to the second support member about a first axis; and
    a second pair of flexible plates joining the second support member to the intermediate member, the second pair flexible plates being configured orthogonal to each other to allow pivoting motion of the first support member relative to the second support member about a second axis orthogonal to the first axis.

16. The platform balance of claim 10 wherein the planar motion assembly comprises a fluid bearing.

17. A platform balance comprising:
    a first frame support;
    a second frame support, the first frame support movable relative to the second frame support; and
    at least one counter balance assembly comprising:
       a beam;
       a first pivot assembly supported by the second frame support and allowing the beam to pivot;
       a weight selectively positionable on the beam; and
       a compliant assembly supported by the beam on a portion thereof on a side of the first pivot assembly opposite the weight, the compliant assembly supporting the first frame support, the compliant assembly comprising:
  a cross flexure assembly comprising:
    a first support member;
    a second support member;
    an intermediate member;
    a first pair of flexible plates joining the first support member to the intermediate member, the first pair flexible plates being configured orthogonal to each other to allow pivoting motion of the first support member relative to the second support member about a first axis; and
    a second pair of flexible plates joining the second support member to the intermediate member, the second pair flexible plates being configured orthogonal to each other to allow pivoting motion of the first support member relative to the second support member about a second axis orthogonal to the first axis; and
  a planar motion assembly coupled to the compliant assembly.

18. The platform balance of claim 17 wherein the planar motion assembly comprises a fluid bearing.

19. The platform balance of claim 17 wherein the first pivot assembly comprises a cross flexure assembly.

20. A platform balance comprising:
  a first frame support;
  a second frame support, the first frame support and the second frame support being movable relative to each other; and
  at least one counter balance assembly coupling the first and second frame supports, the at least one counter balance assembly comprising:
    a beam;
    a cross flexure pivot assembly supported by the second frame assembly and allowing the beam to pivot, the cross flexure pivot assembly comprising two spaced-apart sets of orthogonal arranged flexible plates wherein one set of the flexible plates is parallel to a longitudinal axis of the beam;
    a weight selectively positionable along a length of the beam; and
    a planar motion assembly coupled to the beam wherein the planar motion assembly supports the first frame support.

21. The platform balance of claim 20 and further comprising a second pivot assembly supported by the beam remote from the weight.

22. The platform balance of claim 20 wherein the second pivot assembly is configured to provide pivoting motion about two orthogonal axes.

23. The platform balance of claim 20 wherein the second pivot assembly comprises a second cross flexure assembly.

24. The platform balance of claim 20 wherein the second cross flexure assembly comprises:
  a first support member;
  a second support member;
  an intermediate member;
  a first pair of flexible plates joining the first support member to the intermediate member, the first pair flexible plates being configured orthogonal to each other to allow pivoting motion of the first support member relative to the second support member about a first axis; and
  a second pair of flexible plates joining the second support member to the intermediate member, the second pair flexible plates being configured orthogonal to each other to allow pivoting motion of the first support member relative to the second support member about a second axis orthogonal to the first axis.

25. The platform balance of claim 20 wherein the planar motion assembly comprises a fluid bearing.

* * * * *

UNITED STATES PATENT AND TRADEMARK OFFICE
CERTIFICATE OF CORRECTION

PATENT NO. : 7,348,502 B2  
APPLICATION NO. : 11/389519  
DATED : March 25, 2008  
INVENTOR(S) : Meyer et al.

Page 1 of 2

It is certified that error appears in the above-identified patent and that said Letters Patent is hereby corrected as shown below:

On the Title page,
  Item [56] References Cited insert:
    -- U.S. PATENT DOCUMENTS

| | | | |
|---|---|---|---|
| 1,404,920 | * | January 1922 | Zahm |
| 2005120808 | * | June 2005 | Meyer |
| 3,613,443 | * | October 1971 | Truman |
| 3,347,328 | * | October 1967 | Schieser |
| 2,353,033 | * | July 1944 | Hem |
| 1,710,135 | * | April 1929 | Zahm |
| 3,734,218 | * | May 1973 | Kupper |
| 3,224,519 | * | December 1965 | Alred Fletcher Lawrence |
| 3,931,860 | * | January 1976 | Czyryk |
| 2006191355 | * | August 2006 | Olson |
| 2007039400 | * | February 2007 | Meyer |

[56] FOREIGN PATENT DOCUMENTS  
2006/096736    Sep., 2006    WIPO

[56] OTHER REFERENCES

Official Search Report of the European Patent Office in counterpart foreign application No. PCT/US2007/007389 filed March 23, 2007.

Written Opinion of the International Searching Authority of the European Patent Office in counterpart foreign application No. PCT/US2007/007389 filed March 23, 2007.

Zahm, A.F.: "The six-component wind balance" NACA ANNUAL REPORT 8, NACA Technical REPORT 146, 1923, pages 383-395.

Signed and Sealed this  
Eleventh Day of October, 2011

David J. Kappos  
*Director of the United States Patent and Trademark Office*

Zahm, A.F.: "The aerodynamic plane table" NACA ANNUAL REPORT 9, NACA Technical Report 166, 1924, pages 187-197. --